(12) United States Patent
Fisk et al.

(10) Patent No.: US 9,969,654 B2
(45) Date of Patent: May 15, 2018

(54) METHOD OF BONDING A METALLIC COMPONENT TO A NON-METALLIC COMPONENT USING A COMPLIANT MATERIAL

(71) Applicant: UNITED TECHNOLOGIES CORPORATION, Farmington, CT (US)

(72) Inventors: Benjamin T. Fisk, East Granby, CT (US); Grant O. Cook, III, Spring, TX (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 396 days.

(21) Appl. No.: 14/601,520

(22) Filed: Jan. 21, 2015

(65) Prior Publication Data

US 2017/0015596 A1    Jan. 19, 2017

Related U.S. Application Data

(60) Provisional application No. 61/931,182, filed on Jan. 24, 2014.

(51) Int. Cl.
*B23K 31/02* (2006.01)
*C04B 37/02* (2006.01)
(Continued)

(52) U.S. Cl.
CPC ............ *C04B 37/026* (2013.01); *B23K 20/02* (2013.01); *B23K 20/021* (2013.01); *B23K 20/16* (2013.01);
(Continued)

(58) Field of Classification Search
CPC ............ C04B 37/026; C04B 2237/121; C04B 2237/60; B32B 15/04; B32B 7/04;
(Continued)

(56) References Cited

U.S. PATENT DOCUMENTS 4,838,474 A * 6/1989 Ohashi ................ B23K 35/002
228/121
4,872,606 A * 10/1989 Satoh .................... C04B 37/006
228/119

(Continued)

FOREIGN PATENT DOCUMENTS

DE        23 18 727 A1   11/1973
DE   10 2007 020389 A1   11/2008
EP         1 642 667 A1    5/2006

OTHER PUBLICATIONS

European Search Report for related European Application No. EP15152362; report dated Jul. 3, 2015.
(Continued)

*Primary Examiner* — Kiley Stoner
(74) *Attorney, Agent, or Firm* — Cantor Colburn LLP

(57) ABSTRACT

A means for attaching a metallic component to a non-metallic component using a compliant material having thermal properties intermediate those of the metallic component to a non-metallic component is provided. The method can accommodate CTE mismatches and wear-type problems common to many assemblies of dissimilar materials. In particular, the method provides a sufficient wear surface to accommodate relative motion and provide a durable wear surface that does not excessively wear/gall/mico-weld itself together and provides the necessary damping and motion for proper operation in aeronautical applications.

11 Claims, 3 Drawing Sheets

(51) Int. Cl.
*B23K 20/02* (2006.01)
*B23K 20/16* (2006.01)
*B23K 20/233* (2006.01)
*B32B 7/04* (2006.01)
*B32B 15/04* (2006.01)
*B23K 103/16* (2006.01)

(52) U.S. Cl.
CPC ............ B23K 20/2333 (2013.01); B32B 7/04 (2013.01); B32B 15/04 (2013.01); *B23K 2203/16* (2013.01); *B32B 2311/24* (2013.01); *B32B 2315/02* (2013.01); *B32B 2605/18* (2013.01); *C04B 2237/121* (2013.01); *C04B 2237/60* (2013.01)

(58) Field of Classification Search
CPC ............ B32B 2605/18; B32B 2315/02; B32B 2311/24; B23K 20/16; B23K 20/2333; B23K 20/021; B23K 2203/16; B23K 1/0018; B23K 20/02–20/026; B23K 20/001; B23K 20/04; B23K 2201/001
USPC ........... 228/193–195, 245–255, 122.1–124.7
See application file for complete search history.

(56) References Cited

U.S. PATENT DOCUMENTS

| | | | | |
|---|---|---|---|---|
| 5,139,594 | A * | 8/1992 | Rabin | C04B 35/645 156/283 |
| 5,234,152 | A | 8/1993 | Glaeser | |
| 5,372,298 | A * | 12/1994 | Glaeser | B23K 20/023 228/121 |
| 5,836,075 | A * | 11/1998 | Fitzgerald | B23H 9/10 29/889.2 |
| 6,173,886 | B1 | 1/2001 | McCay | |
| 6,257,481 | B1 * | 7/2001 | Shirzadi-Ghoshouni | B23K 20/16 228/178 |
| 6,619,537 | B1 * | 9/2003 | Zhang | B23K 20/002 204/298.12 |
| 8,087,143 | B2 * | 1/2012 | DiPietro | F41H 5/0442 109/49.5 |
| 9,340,462 | B2 * | 5/2016 | Harris | H01L 21/67103 |
| 9,480,144 | B2 * | 10/2016 | Nagatomo | H01L 23/36 |
| 2005/0098609 | A1 * | 5/2005 | Greenhut | B23K 35/001 228/122.1 |
| 2010/0297463 | A1 * | 11/2010 | Hoffstaedter | B23K 20/02 428/573 |
| 2012/0160084 | A1 * | 6/2012 | Mosser | B23K 1/0008 89/36.02 |
| 2012/0202090 | A1 * | 8/2012 | Yamamoto | B23K 1/19 428/651 |
| 2013/0335921 | A1 * | 12/2013 | Nagatomo | H01L 23/3736 361/709 |
| 2015/0034367 | A1 * | 2/2015 | Nagatomo | H01L 23/36 174/252 |
| 2015/0041188 | A1 * | 2/2015 | Terasaki | B23K 20/02 174/252 |
| 2016/0016245 | A1 * | 1/2016 | Terasaki | C04B 37/026 228/123.1 |
| 2016/0024944 | A1 * | 1/2016 | Suciu | F01D 5/3061 60/805 |
| 2016/0035660 | A1 * | 2/2016 | Terasaki | B32B 15/01 174/252 |
| 2016/0152005 | A1 * | 6/2016 | Roach | B33Y 80/00 428/76 |
| 2016/0201479 | A1 * | 7/2016 | Abbott | F01D 5/282 416/229 A |
| 2016/0236992 | A1 * | 8/2016 | Cook, III | B23K 20/00 |

OTHER PUBLICATIONS

"Overview of Transient Liquid Phase and Partial transient Liquid Phase Bonding", Grant O. Cook III, Carl D. Sorensen, Received Jan. 19, 2011/Accepted: Apr. 12, 2011/ Published online: May 7, 2011 © Springer Science+Business Media, LLC 2011.

* cited by examiner

METHOD OF BONDING A METALLIC COMPONENT TO A NON-METALLIC COMPONENT USING A COMPLIANT MATERIAL

CROSS-REFERENCE TO RELATED APPLICATION

This Application is a non-provisional patent application claiming priority under 35 CSC § 119(e) to U.S. Provisional Patent Application Ser. No. 61/931,182 filed on Jan. 24, 2014.

FIELD OF THE DISCLOSURE

The present disclosure generally relates to a means for attaching a metallic component to a non-metallic component. More specifically, this disclosure relates to a means for attaching a metallic component to a non-metallic component using a compliant material having thermal properties intermediate those of the metallic component to a non-metallic component.

BACKGROUND OF THE DISCLOSURE

Ceramic matrix composites (CMC) are non-metallic materials that typically comprise ceramic fibers embedded in a composite matrix. CMCs are lightweight and exhibit markedly enhanced thermal strengths. These properties have made them attractive materials for component fabrication in many industries, such as the aerospace, automotive, and military equipment industries, where lightweight thermally resistant structures are desired. For example, CMCs continue to be explored for use in gas turbine engine applications to reduce the overall weight of the engine and improve engine efficiency and fuel savings. However, the strength and performance characteristics of CMCs may be dependent upon the integrity of the interfacial bond between the CMC component and any metallic component to which it is mated.

Due to the differing thermal characteristics of metallic and non-metallic materials such as CMCs, including for example the coefficient of thermal expansion (CTE), and the significant wear that can be caused by the relative motion of the two mating components, it is difficult to provide a robust method for attaching a metallic component to a non-metallic component. For example, in jet aircraft applications, for turbine blades, vanes etc., the metallic/non-metallic interface is not permanently affixed but rather experiences significant relative motion.

Thus the interfacial bond strength between the non-metallic component and the metallic component may be compromised upon exposure to high temperatures such as those experienced during some high-temperature engine operations, potentially leading to structural break-down of the component and possible in-service failure. To provide performance characteristics necessary for the safe use of CMCs in gas turbine engines and other applications, strategies are needed to improve the interfacial bond strength of the metallic and non-metallic components.

One possible solution is to provide a sacrificial layer between the metallic and non-metallic component that allows for some relative motion without damaging the two components. The challenge has been to provide a bonding layer of suitable material that is free floating but will remain between two components having different thermal properties. Transient liquid phase (TLP) and partial transient liquid phase (PTLP) bonding processes have been found to be useful alternatives to welding and brazing as ways to bond metals and non-metals such as CMCs.

The TLP bonding process generally involves placing one or more thin compliant interlayers of material between the materials to be bonded to form an assembly; heating the assembly to a first temperature to temporarily produce a "transient" liquid in the bonding region; and maintaining the assembly at a bonding temperature (which may be the same as the first temperature) until the liquid has isothermally solidified due to diffusion of the compliant material into the two components being joined. Holding the assembly at the bonding temperature creates a substantially homogeneous diffusion bond between the two materials. The resulting bond can be stronger than either of the two components alone. The interlayer(s) can be in many forms, including thin foil, powder, paste, vapor deposition, or electroplating. Pressure may be applied to the opposing materials, and various heat sources used, including radiation, conduction, and radio-frequency induction.

The main advantage of TLP bonding is that the resulting bond between the compliant material and the metallic component typically has a melting temperature above the temperature used for TLP bonding so that the formed bond may operate at temperatures well above the bonding temperature. This feature may be advantageous, for example, when joining temperature-sensitive metals whose microstructures could be damaged by too much thermal energy input. TLP bonding is often used in high-temperature applications where welding, brazing, and diffusion brazing cannot be used. The interlayer material may be any metallic material.

Partial transient liquid phase (PTLP) bonding is a variant of TLP typically used to join ceramics. In PTLP bonding, the interlayer may comprise thin layers of low-melting point metals or alloys on each side of a thicker refractory metallic layer. Among the advantages of PTLP bonding are the following: (1) The dual nature of the multi-layer interlayer combines some beneficial properties of brazing and diffusion bonding. (2) Lower bonding temperatures can minimize thermally induced stresses.

PTLP bonding is often performed with elemental interlayers designed to eventually form a solid solution after isothermal solidification and subsequent homogenization steps. However, the resulting strength of the solid-solution bond may not be sufficient for certain applications, especially in the aerospace industry.

The present disclosure is directed to providing a means for attaching a metallic component to a non-metallic component such as a CMC using a compliant material having thermal properties intermediate those of the metallic component and the non-metallic component.

SUMMARY OF THE DISCLOSURE

The present disclosure relates to a means for attaching a metallic component to a non-metallic component using a compliant material having thermal properties intermediate those of the metallic component to a non-metallic component.

In one aspect of the disclosure a method of bonding a metallic component to a non-metallic component is provided. The method may comprise the steps of:
  applying a compliant material between the metallic component and the non-metallic component to create an assembly, the compliant material having one or more thermal properties intermediate those of the metallic component and the non-metallic component;

heating the assembly to a first temperature suitable to temporarily liquefy the compliant material without melting the metallic component; and bonding the metallic component and the non-metallic component by maintaining the assembly at a bonding temperature until the compliant material forms a solid bonding layer, wherein the bonding layer has a higher melting point than the first temperature.

The compliant material may be applied by a process selected from the group consisting of foil layup, powder application, plating, chemical vapor deposition, physical vapor deposition, cold spraying, and plasma spraying.

The heating step may be accomplished by a process selected from the group consisting of radiation, conduction, radio-frequency induction, resistance, laser, and infrared heating.

During the bonding step the compliant material may diffuse into both the metallic component and into the non-metallic component.

During the bonding step the compliant material may be precipitation hardened by holding the assembly at a hardening temperature lower than the first temperature for a specified period of time.

One of the one or more thermal properties may be the coefficient of thermal expansion.

The non-metallic component may be a ceramic matrix composite.

The compliant material may consists essentially of a single thin homogenous interlayer. The interlayer may be a thin foil (such as aluminum foil), a powder or a paste.

Where the compliant material comprises a multi-layer interlayer, the method may comprise the additional step of homogenizing the compliant material that forms the bond by maintaining the assembly at a suitable second temperature. The second temperature may be higher, lower or the same as the first temperature.

The metallic component may be a platform and the non-metallic component may be a vane or fin structure mountable to the platform.

In another aspect the disclosure describes a bonded assembly comprising a metallic component; a non-metallic component; and a compliant material located in a bonding region between the metallic component and the non-metallic component, the compliant material having one or more thermal properties intermediate those of the metallic component and the non-metallic component. The thermal property may be the coefficient of thermal expansion.

The non-metallic component may be a ceramic matrix composite.

The compliant material may consist essentially of a single thin homogenous interlayer.

The interlayer may be a thin foil, a powder and a paste.

In still another aspect the disclosure provides a method of joining a metallic component to a component made of ceramic matrix composite material, the method comprising the steps of:
  providing a compliant material having a coefficient of thermal expansion intermediate the coefficient of thermal expansions of the metallic component and the non-metallic component;
  placing the compliant material between the metallic component and the non-metallic component to create an assembly;
  liquefying the compliant material at a first temperature; and
  bonding the metallic component to the non-metallic component by maintaining the assembly at a temperature at which the compliant material forms a diffusion bond with both the metallic component and the non-metallic component.

Although the different examples described herein may have the specific components shown in the illustrations, embodiments of this disclosure are not limited to those particular combinations of components. It is possible to use some of the components or features from one of the examples in combination with features or components from another one of the examples.

Figure 1:
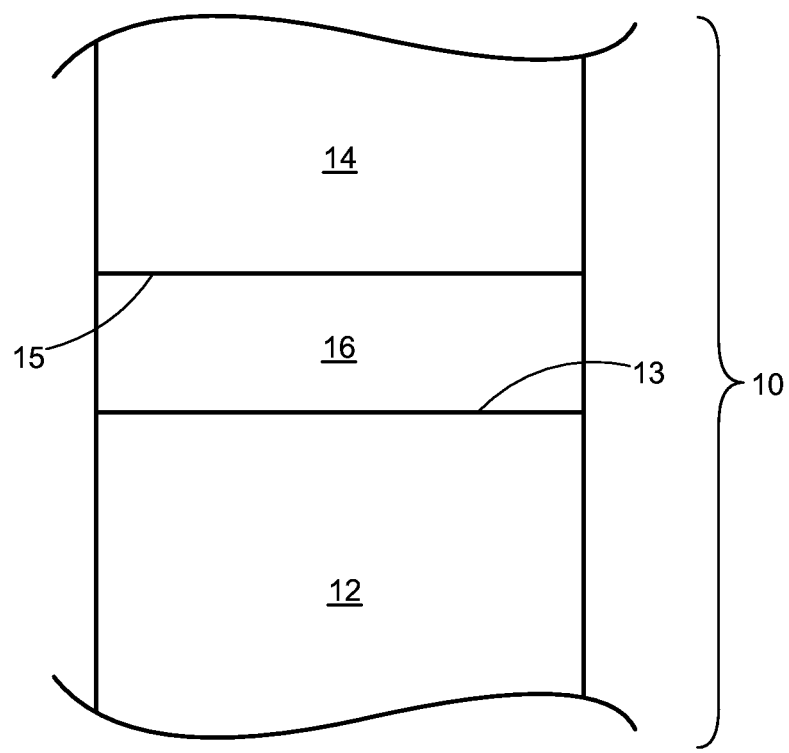
FIG. 1 is a schematic representation illustrating an assembly for forming a compliant wear surface between a metallic material and a non-metallic material in accordance with the present disclosure.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

For the purpose of this disclosure the following definition applies: "Thermal property" means a physical property related to the application of heat energy, such as but not limited to the coefficient of thermal expansion (CTE), thermal conductivity and heat capacity.

The present disclosure relates to a method for attaching a metallic component 12 to a non-metallic component 14 using a compliant material 16 having thermal properties intermediate those of the metallic component 12 and the non-metallic component 14. The resulting bonded assembly 10 has a robust mechanical attachment along the bonding region 13 of the metallic component. The method can accommodate CTE mismatches and wear-type problems common to many assemblies of dissimilar materials. In particular, the method provides a sufficient bonding surface to accommodate relative motion and provide a durable wear surface that does not excessively wear/gall/mico-weld itself together, and provide the necessary damping and motion for proper operation.

FIG. 1 is a schematic of a bonded assembly 10 according to the disclosure. The assembly 10 comprises a compliant material 16 interposed between a non-metallic component 14 and a metallic component 12.

The metallic component 12 may be a structure made of metallic or composite materials. The metallic component 12 may be a component of a jet engine such as a platform for a vane or fin structure.

The non-metallic component 14 may be made of ceramic, a ceramic matrix composite (CMC) or any non-metallic material suitable for aeronautical use. The non-metallic component 14 may be a component of a jet engine such as a vane or fin structure.

The compliant material 16 may be non-metallic or metallic (such as aluminum). In the embodiment shown in FIG. 1 the compliant material 16 is a single thin homogenous layer of material. The compliant material 16 may be in the form of a thin foil, powder, paste or other suitable form.

The compliant material 16 should have one or more thermal properties, such as the coefficient of thermal expansion (CTE), intermediate those of the metallic component and the non-metallic component.

The compliant material 16 may be capable of imparting the non-metallic component 14 with one or more properties favorable to its operation and use, such as hardness or enhanced thermal stability.

Figure 2:
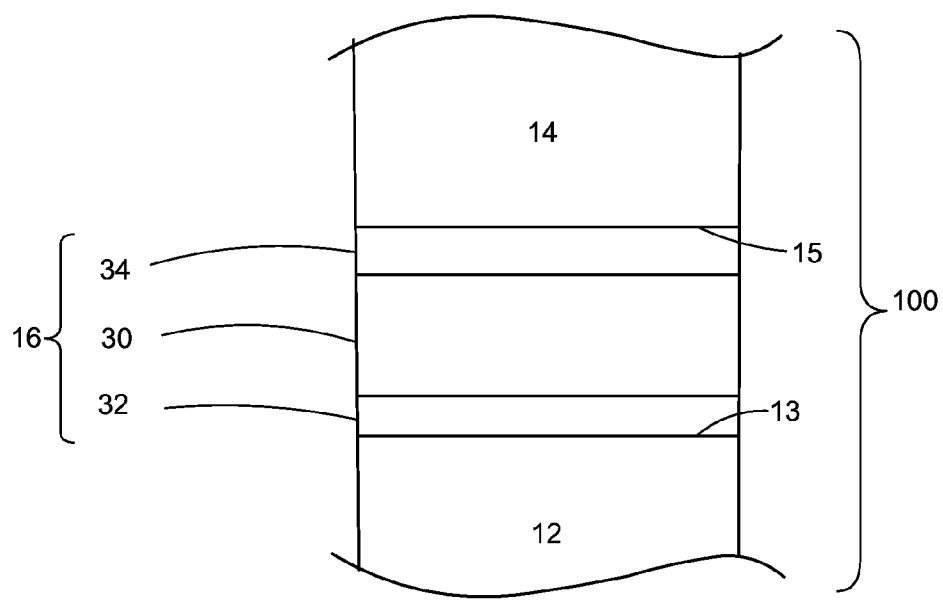
FIG. 2 is a schematic representation illustrating another assembly for forming a compliant wear surface between a metallic material and a non-metallic material in accordance with the present disclosure.

FIG. 2 is a schematic representation illustrating another assembly 100 for forming a compliant wear surface between a metallic material 12 and a non-metallic material 14 in accordance with the present disclosure. In this embodiment the complaint material 16 comprises multiple layers. For example and without limitation, the compliant material 16 may comprise a relatively thicker middle layer 30 interposed between a first outer layer 32 and a second outer layer 34. The middle layer 30 and the outer layers 32, 34 may be metal, metal alloys or any suitable materials. The compliant material 16 may comprise layers of thin foil, powder or paste or combinations thereof.

Figure 3:
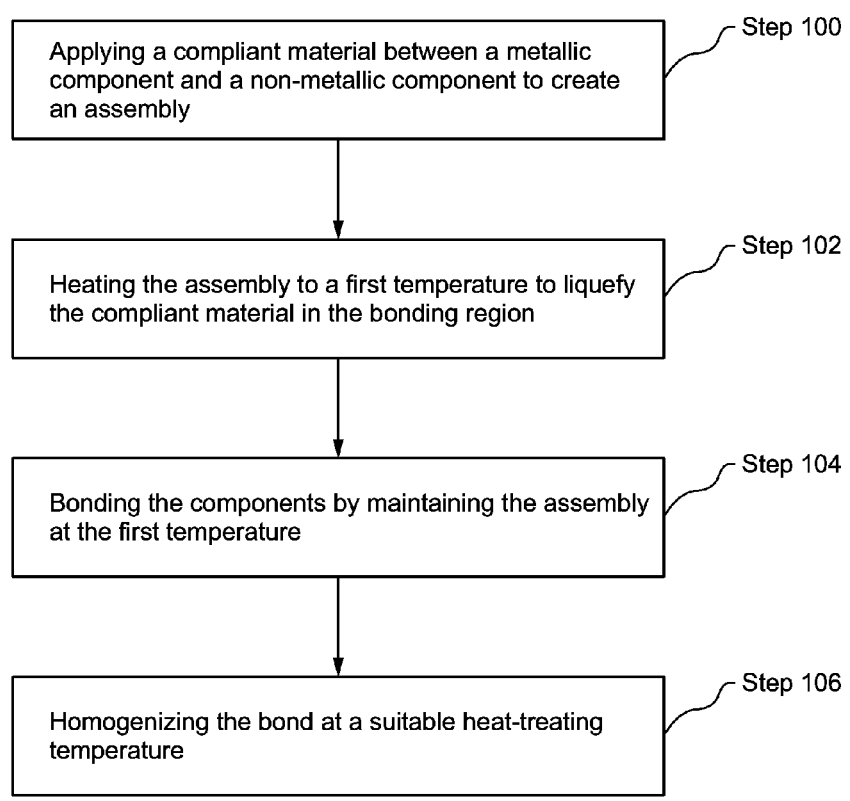
FIG. 3 is a flow diagram illustrating steps involved in the creation of a compliant wear surface in accordance with a method of the present disclosure.

FIG. 3 is a flow-chart diagram illustrating steps involved in the creation of a bonded assembly 10 in accordance with a method of the present disclosure. The method may comprise the following steps:

Step 100: Applying a thin layer of compliant material 16 between a metallic component 12 and a non-metallic component 14 to create an assembly 10. The compliant material 16 may be applied to the bonding region 13 of the metallic component 12 by any suitable means, including without limitation foil layup, powder application, plating, chemical vapor deposition, physical vapor deposition, cold spraying, or plasma spraying. The compliant material 16 may be applied to the bonding region 15 of the non-metallic component 14 by a process such as transient liquid phase (TLP) bonding, partial TLP (PTLP) bonding, brazing, etc. TLP and PTLP bonding are preferred due to their refractory nature, i.e., the bonds can be used at or above the bonding temperature.

Step 102: Heating the assembly 10 to a first temperature suitable to temporarily liquefy the compliant material 16 in the bonding region, e.g., the region between the non-metallic component 14 and the metallic component 12. Heating may be accomplished by any conventional means, such as radiation, conduction, radio-frequency induction, resistance, laser, or infrared heating, and can cause direct or eutectic melting in the interlayer.

Step 104: Bonding the metallic component 12 and the non-metallic component 14 by maintaining the assembly 10 at a bonding temperature until the compliant material 16 forms a solid bonding layer, wherein the bonding layer has a higher melting point than the first temperature. The bonding temperature may or may not be the same as the first temperature.

The bonding step may involve diffusion of the compliant material 16 into both the metallic component 12 and into the non-metallic component 14.

The bonding step may involve precipitation hardening the compliant material 16 by holding the assembly 10 at a hardening temperature $T_{PH}$ lower than the bonding temperature $T_{bond}$ for a specified period of time, thereby creating a precipitation-hardened bond. The assembly 10 may be cooled below the hardening temperature $T_{PH}$ and then heated back up to the hardening temperature $T_{PH}$, or simply cooled down from the bonding temperature $T_{bond}$ to the hardening temperature $T_{PH}$ and held there until the compliant material forming the bond is hardened.

During the bonding step 104 TLP or PTLP bonding may occur. In TLP and PTLP bonding, at least one component of the compliant material 16 reacts with the non-metallic component 14 to wet it (adhere to it) while at least one component of the compliant material 16 diffuses into the metallic component 12. If the compliant material 16 is non-metallic, then the compliant material reacts with the metallic component rather than diffusing into the metallic component.

These multiple purposes of the TLP or PTLP bonding materials can be accomplished using an alloy foil, multiple layers of elemental foils or any combination therefor. While foils may be suitable for this purpose, the compliant material 16 may also be a powder, powder compact, braze paste or applied via electroplating or physical vapor deposition (PVD). The selection of bonding materials can be used to further accommodate CTE or compliance mismatches.

Where the compliant layer 16 comprises multiple layers of different materials, the method may include the additional step 106 of homogenizing the compliant material that forms the bond by maintaining the assembly at a suitable second temperature. The second temperature may be higher, lower or the same as the first temperature. The homogenizing step may involve diffusion of the middle layer 30 into the outer layers 32, 34.

BENEFITS/INDUSTRIAL APPLICABILITY

From the foregoing, it can therefore be seen that the present disclosure can find industrial applicability in many situations, including, but not limited to, industries requiring light-weight and high-strength hybrid components having improved strength and wear resistance, including components that operate in high-temperature environments, such as combustors in jet engines. The disclosure can facilitate the optimal selection of non-metallic materials independent of the optimal selection of the metallic materials.

For example, the technology as disclosed herein can provide CMC components mated to metallic components to increase the temperature resistance of the metallic component and improve the resistance of the compliant material against environmental effects such as erosion and foreign-object damage. Furthermore, as disclosed herein, CMCs may be mated with metallic or metallic composite components to provide hybrid composite structures. The technology as disclosed herein may find wide industrial applicability in a wide range of areas including, but not limited to, aerospace industries, automotive industries, and sporting industries.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A method of bonding a metallic component to a ceramic matrix composite comprising the steps of:
   applying a compliant material between the metallic component and the ceramic matrix composite to create an assembly, the compliant material having a coefficient of thermal expansion intermediate those of the metallic component and the ceramic matrix composite;
   heating the assembly to a first temperature suitable to temporarily liquefy the compliant material without melting the metallic component; and
   bonding the metallic component and the ceramic matrix composite by maintaining the assembly at a bonding temperature until the compliant material forms a solid bonding layer, wherein the bonding layer has a higher melting point than the first temperature and further wherein during the bonding step the compliant material diffuses into both the metallic component and into the ceramic matrix composite.

2. The method of claim 1 wherein:
   the compliant material is applied by a process selected from the group consisting of foil layup, powder application, plating, chemical vapor deposition, physical vapor deposition, cold spraying, and plasma spraying.

3. The method of claim 1 wherein:
   the heating step is accomplished by a process selected from the group consisting of radiation, conduction, radio-frequency induction, resistance, laser, and infrared heating.

4. The method of claim 1 wherein:
   during the bonding step the compliant material is precipitation hardened by holding the assembly at a hardening temperature lower than the first temperature for a specified period of time.

5. The method of claim 1 wherein:
   the compliant material consists essentially of a single homogenous interlayer.

6. The method of claim 5 wherein:
   the interlayer is a selected from the group consisting of a foil, a powder and a paste.

7. The method of claim 6 wherein:
   the interlayer is a foil of aluminum.

8. The method of claim 1 wherein the compliant material comprises a multi-layer interlayer, the method comprising the additional step of:
   homogenizing the compliant material that forms the bond by maintaining the assembly at a suitable second temperature.

9. The method of claim 8 wherein:
   the second temperature is different from the first temperature.

10. The method of claim 3 wherein:
    the metallic component is a platform and the ceramic matrix composite is a vane or fin structure mountable to the platform.

11. A method of joining a metallic component to a non-metallic component made of ceramic matrix composite material, the method comprising the steps of:
    providing a compliant material having a coefficient of thermal expansion intermediate the coefficient of thermal expansions of the metallic component and the non-metallic component;
    placing the compliant material between the metallic component and the non-metallic component to create an assembly;
    liquefying the compliant material at a first temperature; and
    bonding the metallic component to the non-metallic component by maintaining the assembly at a temperature at which the compliant material forms a diffusion bond with both the metallic component and the non-metallic component, wherein the metallic component is a platform and the non-metallic component is a vane or fin structure mountable to the platform.

* * * * *